United States Patent [19]
Augustin

[11] 3,927,241
[45] Dec. 16, 1975

[54] FRICTION ELEMENTS RUNNING IN OIL

[75] Inventor: Wilfried Augustin, Wittenkamp, Germany

[73] Assignee: Jurid Werke GmbH, Glinde near Hamburg, Germany

[22] Filed: Aug. 8, 1974

[21] Appl. No.: 495,807

[30] Foreign Application Priority Data
Aug. 10, 1973 Germany............................ 2340464

[52] U.S. Cl......... 428/408; 192/107 M; 192/125 C; 188/251 A; 428/65; 428/66; 428/367; 428/902
[51] Int. Cl.² ...................... F16D 55/36; D04H 3/02
[58] Field of Search ................... 192/107 M, 125 C; 188/251 A; 161/213, 215, 205, 170, 164, 155, 156, 158; 428/64, 65, 66, 367, 408, 902

[56] References Cited
UNITED STATES PATENTS

| | | | |
|---|---|---|---|
| 1,950,262 | 3/1934 | Norton | 188/251 A |
| 2,553,215 | 5/1951 | Schultz | 161/205 X |
| 3,554,860 | 1/1971 | Lacroix | 192/107 M |
| 3,639,197 | 2/1972 | Spain | 192/107 M |
| 3,730,320 | 5/1973 | Freeder et al. | 192/107 M |
| 3,738,901 | 6/1973 | Matsushima et al. | 192/107 M |
| 3,759,353 | 9/1973 | Marin | 192/107 M |
| 3,791,493 | 2/1974 | Yamaguchi et al. | 192/107 M |

*Primary Examiner*—William J. Van Balen
*Attorney, Agent, or Firm*—Young & Thompson

[57] ABSTRACT

A friction member for friction engaging mechanisms, such as clutches and automatic transmissions, adapted to operate in oil or other fluids comprising a metal core member and at least one friction facing, said friction facing comprising a web of carbon filaments impregnated with an organic resin bonding agent. The friction element may contain an intermediate layer arranged between the core member and the friction facing, said intermediate layer comprising a felt or web of a paperlike structure which is made basically of fibers other than carbon fibers, such as cellulosic fibers or synthetic fibers or asbestos fibers.

4 Claims, 5 Drawing Figures

FRICTION ELEMENTS RUNNING IN OIL

SUMMARY OF THE INVENTION

The article of the invention is a friction element for operating in oil for friction engaging mechanisms, and more particularly an improved friction element consisting basically of a metal core member and a friction lining adhesively bonded or riveted or otherwise secured to the core member, said friction lining consisting of a compact of fibrous material and an organic resin binder.

It is known to construct clutch plates, for example for automatic transmissions, from a metal support and a friction layer fixed thereon. The metal support can be made of steel and the friction layer is usually a paper-felt, such as an asbestos paper, which has been impregnated with an organic resin binder material, such as a phenol formaldehyde resin and, as a rule, the friction layer is adhesively fastened to the metal support. Such friction elements exhibit satisfactory operational properties under normal conditions, but show deficiencies in operation at higher loads. The reason for this lies in the peak temperatures exhibited on the friction surface, particularly during heavy duty stressing. A thermal degradation of the organic components of the friction material takes place which is manifested by an increased wear and also by an alteration in the friction properties throughout the operative range. Attempts have been made to minimise the occurrence of this wear by incorporating powdered carbon into the friction layer materials. For example, it is known from German published specification No. 1,525,334 to provide a friction layer which contains carbon particles in an amount of more than 50 percent by weight, for instance in the form of powdered graphite or petroleum coke, compacted with an organic binding agent, in particular a furfural resin or a phenol-formaldehyde resin or some other heat-hardenable resin, which has a porous structure and is adhesively secured to a metal support. A disadvantage of these known elements intended for running in oil is that, because of the continuous oil penetration through the porous material under pressure, softening can take place in the cured binder material, so that the binder softens and the firm bond between the carbon particles becomes loosened, which leads to separation and destruction of the lining.

Good thermal stability and resistance to wear are provided by a friction material known from the applicant's Published German specification No. 2,144,367, for the manufacture of which an inorganic non-metallic binder is admixed with carbon fibers and with at least one friction-modifying constituent selceted from the group consisting of metal powder, metal fibers, silicon carbide powder and graphite power, so that this known friction element contains the carbon fibers embedded in a matrix of inorganic material. Because of its relatively high proportion of inorganic constituents, particularly metal powders, the specific gravity of these known friction elements is relatively high which is undesirable for many applications of use. Also, this friction material is intended for running in air, i.e., without a liquid coolant.

It is an object of the present invention to manufacture a friction element for operating in oil or other fluids which does not show increased wear under heavy loads.

A further object of the invention is to provide an improved friction element which exhibits substantially no alteration of its friction properties over the range of use under heavy loads and at the peak temperatures then occurring.

A still further object of the invention is to provide a friction element comprising a metal support and a friction layer consisting of a carbon fiber web impregnated with an organic binding agent.

A still further object of the present invention is to provide a friction element for friction engaging mechanisms adapted to operate in oil comprising a metal core member, an intermediate layer of fibers other than carbon fibers applied to the core member and a friction facing applied to the intermediate layer, said friction facing comprising a web of carbon filaments impregnated with an organic resin binding agent.

Further objects and advantages will become apparent and the invention may be better understood from consideration of the following description taken in connection with the accompanying drawings in which.

Figure 1:
FIG. 1 shows a friction element according to the invention, in cross-section.
Figure 2:
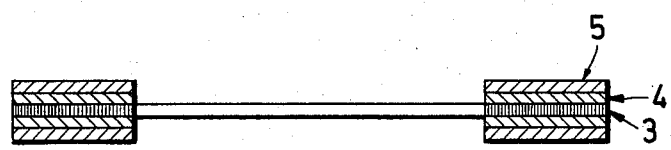
FIG. 2 shows a modified form of a friction element according to the invention, in cross-section.
Figure 3:
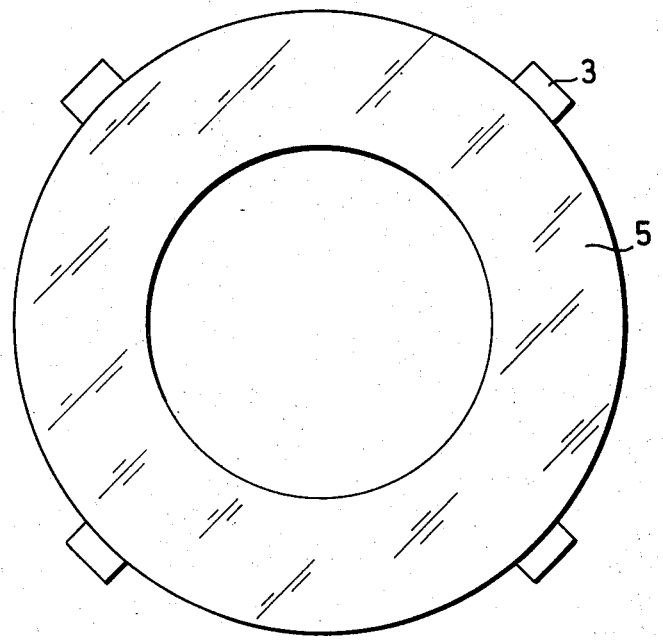
FIG. 3 shows a plan view of the embodiment of FIG. 2.

In FIG. 1, a core plate 1 comprises an annular steel sheet and this has adhered to it on either side over its entire surface a layer 2 of carbon fiber fabric or web impregnated with a phenolic resin binder. In FIG. 2, an embodiment is shown which comprises an annular steel support plate 3 completely covered on both sides with adhered layers of asbestos paper 4 impregnated with phenol resin, and, applied thereon, carbon fiber fabric layers 5. A plan view of this embodiment is illustrated in FIG. 3.

Figure 4:
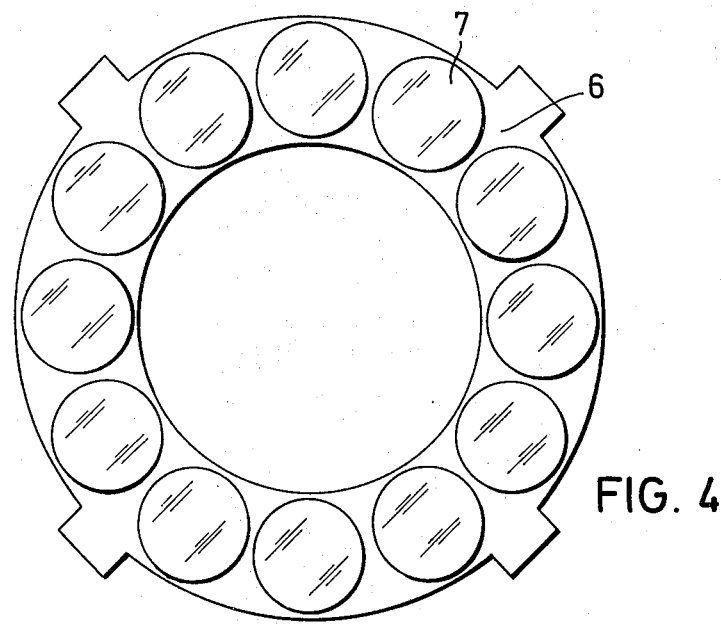
FIG. 4 shows a plan view of a further modified form of a friction element according to the invention.
Figure 5:
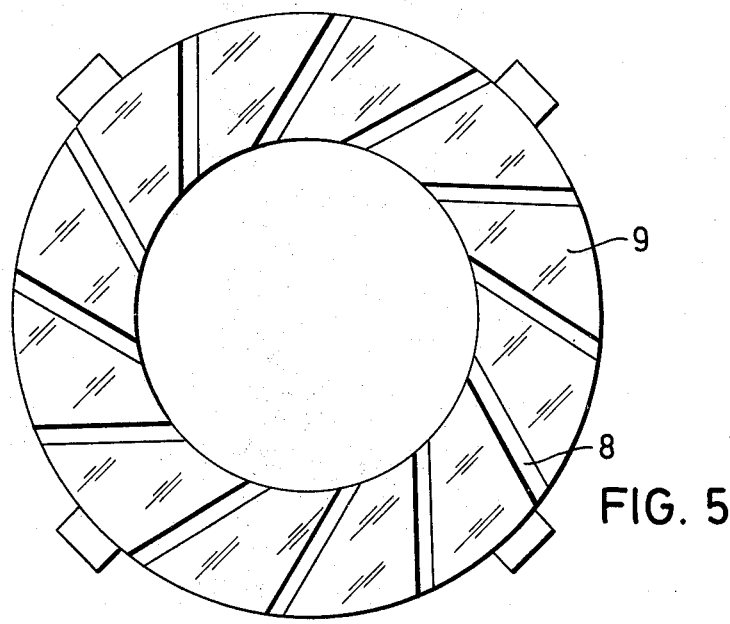
FIG. 5 shows a plan view of another embodiment of a friction element according to the invention.

In FIGS. 4 and 5, embodiments are illustrated in which the carbon fiber fabric layer is not provided over the whole surface area of the support material, but covers it in parts. FIG. 4 shows symmetrically arranged circular carbon fiber fabric segments 7 as linings on an annular core member 6 consisting of steel sheet and FIG. 5 shows an embodiment in which the carbon fiber fabric lining is applied in the form of symmetrically distributed annular segments 9 fixed to the annular support sheet 8.

It has surprisingly been shown that the friction element according to the invention has a substantially higher thermal resistance of the friction lining than the previously known friction materials including organic binding agents in the friction layer. This has led the applicant not only to the conclusion that the carbon fibers which support wear in the friction element according to the invention have a substantially greater thermal stability than the cellulose fibers used in the known fiber-reinforced friction layers, which fibers tend to deteriorate at temperatures around 200°C., and also better than asbestos fibers, which begin to dehydrate at temperatures about 500°C. It can also be seen that this surprisingly high thermal stability has its origin in the better heat conductivity of the carbon fibers, so that, by the presence of the heat-conductive carbon fiber web, so rapid a heat conduction arises during operation that the occurrence of peak temperatures is avoided. If, in accordance with the present state of the art, phenolic resins are used as the fiber matrix for cellulose fibers, as is known the cellulose fibers completely lose their mechanical strength if temperatures are achieved at which the mechanical properties of the cured phenolic resin are no longer sufficient for it to serve as the matrix. Also, with phenolic resins as the matrix, bound asbestos fibers suffer a loss of strength at temperatures at which the phenolic resin matrix is unstable. It has surprisingly been found with the friction element according to the invention that the mechanical strength of the carbon fibers therein suffers no loss at temperatures at which the phenolic resins would normally become destroyed. Surprisingly, it has been shown that even the phenol resin matrix, in the friction element according to the invention, in which the carbon fibers are present as the substrate, may be subjected to higher temperatures without becoming unstable or destroyed. This also possibly may be the consequence of the particularly good heat conductivity and heat dissipation of the carbon fiber web, with the help of which peak temperatures are avoided by heat conduction.

In the friction element according to the invention, as the support material, any flat materials customarily used for this purpose can be employed. The support material may be a metal, for example a non-ferrous metal or a light-alloy metal or a light metal. It can also consist of ceramic material. Furthermore, the support member may be a sheet material of an organic polymer, leather or paper material, if required after having been impregnated with an impregnation agent and hardened or cured.

Carbon fiber web materials which can be used in carrying out the invention are commercial products. They can either be oriented webs or non-oriented felt-like materials. For example, a relatively close-meshed fabric can be employed which as such exhibits good cohesion and a certain degree of dimensional stability.

As the binders, the binding agent materials known for this purpose in friction lining construction can be used, particularly organic polymers or polymer mixtures or other organic synthetic resins. Duroplasts such as phenol formaldehyde resins, urea resins, melamine resins, epoxide resins, polyurethane resins, polyesters or polyfluorocarbon resins are particularly suitable. The resin may be cured in any well known manner including using heat and/or a catalyst.

The binding agent for fixing the carbon fiber web or fabric, insofar as the fabric included is relatively wide meshed, can simultaneously serve as the matrix for binding together the carbon fiber web.

For certain intended uses, it has been found advantageous to build the friction element according to the invention with an intermediate layer of fibrous materials other than carbon fibers arranged between the support material and the carbon fiber friction layer. Such an intermediate layer can consist for example of asbestos fiber material, such as an asbestos felt, usually termed "asbestos paper" i.e., a sheet-like structure of asbestos fibers impregnated and cured or compacted with an organic resin binder, such as a phenolic resin. Other fibers which may be added to build the intermediate layer are cellulosic fibers or other synthetic fibers. A friction element according to the invention with an intermediate layer is structured so that between the carbon fiber layer and the core member an asbestos paper layer or any other layer of fibrous material other than carbon fibers is located.

For some intended applications, it is recommendable to apply the carbon fiber friction layer not over the entire surface of the support material, but to arrange the carbon fiber layer over parts of the surface of the support material, preferably with surface areas of friction lining which are symmetrically arranged as is illustrated in FIGS. 4 and 5.

The general nature of the invention having been set forth, the following examples are presented to illustrate but not to limit the preferred means for carrying out the invention.

EXAMPLE 1

A ring is stamped from a commercially available carbon fiber fabric (manufactured by Carborundum Ltd.), having an internal diameter of 105 mm. and an external diameter of 145 mm. This carbon fiber fabric ring was impregnated with a phenol resin solution (resin content 60 percent, viscosity at 25°C 460 cP., specific gravity 1.09). In the still moist form, the impregnated fabric was applied on both sides of an annular support member consisting of sheet steel and having an external diameter of 145 mm. and an internal diameter of 105 mm., to which it was attached by being impregnated with an adhesive. This assembly was dried for 60 minutes at 80°C. to eliminate the solvent and was then hot pressed under 10 tons pressure at 165°C. for 10 minutes.

EXAMPLE 2

A steel sheet with an external diameter of 145 mm. and an internal diameter of 125 mm. was cleaned and impregnated with an adhesive. A ring was stamped from a commercially available asbestos paper having the same internal and external diameters as the steel support sheet. Circular segments having a diameter of 20 mm. were stamped from a commercially available carbon fiber fabric. The asbestos paper was then impregnated with a phenolic resin solution and applied to the support material while still moist. Then the carbon fiber fabric portions were impregnated with the phenolic resin solution and applied to the still moist asbestos paper layer while still themselves moist. In a similar manner, the other side of the support material was also lined. The whole assembly was dried for 60 minutes at 80°C. and then pressed at 10 tons and 165°C. for 10 minutes.

The friction elements according to the invention thus manufactured have friction layers which in practice are free from thermal damage and, despite good mechanical properties, for example, good values of coefficient of friction and satisfactory behaviour as regards the counter material, have an excellent ability to take up oil.

It was found that the coefficient of friction had not substantially been altered from about 0.11 after 2000 operations and no visible wear could be observed when a friction element as described in Example 2 had been put into service.

I claim:

1. A friction member for friction engaging mechanisms adapted to operate in oil comprising a support plate and a friction facing bonded to the support plate, said friction facing consisting essentially of a web of carbon filaments impregnated with a cured duroplast organic resin bonding agent.

2. A friction member for use in wet clutches adapted to operate in connection with bringing two rotating parts into synchronism, comprising a steel support plate, an intermediate layer of asbestos fibers bonded to the steel member and a friction facing bonded to the layer of asbestos fibers, said friction facing consisting essentially of a web of carbon filaments impregnated with a cured duroplast organic resin bonding agent.

3. A friction member for use in wet clutches and automatic transmission comprising a metal support plate and a surface lining of a web of carbon filaments compacted with a cured duroplast organic resin binder and bonded between the support plate and the surface lining, an intermediate layer of a fibrous material other than carbon fibers.

4. The friction material as in claim 3 wherein the web of carbon filament is compacted with a cured phenolic resin binder and the intermediate layer of asbestos fibers is compacted with a cured phenolic resin binder.

* * * * *